(12) United States Patent
Hwang

(10) Patent No.: US 7,688,854 B2
(45) Date of Patent: Mar. 30, 2010

(54) GENERALIZED SPARE EXTENSION FIELD USAGE IN FRAME PROTOCOL DATA FRAME

(75) Inventor: Woonhee Hwang, Espoo (FI)

(73) Assignee: Nokia Corporation, Espoo (FI)

( * ) Notice: Subject to any disclaimer, the term of this patent is extended or adjusted under 35 U.S.C. 154(b) by 942 days.

(21) Appl. No.: 10/932,546

(22) Filed: Sep. 1, 2004

(65) Prior Publication Data

US 2005/0074034 A1     Apr. 7, 2005

Related U.S. Application Data

(60) Provisional application No. 60/519,537, filed on Nov. 12, 2003, provisional application No. 60/508,384, filed on Oct. 3, 2003.

(51) Int. Cl.
    *H04J 3/22* (2006.01)
(52) U.S. Cl. .................. 370/469; 370/472; 370/476
(58) Field of Classification Search .......... 370/389, 370/469, 470, 471, 472
    See application file for complete search history.

(56) References Cited

U.S. PATENT DOCUMENTS

| | | | |
|---|---|---|---|
| 5,852,630 A * | 12/1998 | Langberg et al. ............ 375/219 |
| 7,283,502 B1 * | 10/2007 | Abraham et al. ............ 370/337 |
| 2002/0061764 A1 * | 5/2002 | Kim et al. ................. 455/522 |
| 2003/0002467 A1 * | 1/2003 | Leung ...................... 370/338 |
| 2003/0081592 A1 * | 5/2003 | Krishnarajah et al. ....... 370/352 |
| 2003/0114181 A1 * | 6/2003 | Lee et al. .................. 455/522 |
| 2005/0063347 A1 * | 3/2005 | Sarkkinen et al. .......... 370/338 |

FOREIGN PATENT DOCUMENTS

| | | |
|---|---|---|
| RU | 2217869 | 11/2003 |
| WO | WO 00/69147 | 11/2000 |
| WO | WO 01/05106 | 1/2001 |

(Continued)

OTHER PUBLICATIONS

3GPP TS 25.425 V5.5.0 (Jun. 2003); 3rd Generation Partnership Project; Technical Specification Group Radio Access Network; UTRAN Iur Interface User Plane Protocols for Common Transport Channel Data Streams (Release 5).

(Continued)

*Primary Examiner*—Jayanti K Patel
*Assistant Examiner*—Bo Hui A. Zhu
(74) *Attorney, Agent, or Firm*—Ware, Fressola, Van Der Sluys & Adolphson LLP

(57) ABSTRACT

A protocol (and corresponding equipment) for use in communicating between a sending node (11) and a receiving node (12) a frame (10) including a Spare Extension (SE) section conveying values for one or more information element (IE) fields, and also including a New IE Flags IE or other device for indicating to the receiving node (12) whether the SE section includes valid data for each IE in the SE section. A flag indicating whether valid data is provided in the SE section can be used, and also an IE indicating the length of the SE section. The protocol is such that the receiving node (12) treats an IE field value occurring in the SE section as spare bits if the IE field was introduced for a version of a later release of a specification than that according to which the receiving node (12) was implemented.

41 Claims, 9 Drawing Sheets

FOREIGN PATENT DOCUMENTS

WO      WO 03/019960      3/2003

OTHER PUBLICATIONS

3GPP TS 25.427 V5.2.0 (Sep. 2003); 3rd Generation Partnership Project; Technical Specification Group Radio Access Network; UTRAN Iub/Iur Interface User Plane Protocol for DCH Data Streams (Release 5).

3GPP TS 25.436 V5.5.0 (Jun. 2003); 3rd Generation Partnership Project; Technical Specification Group Radio Access Network; UTRAN Iub Interface User Plane Protocols for Common Transport Channel Data Streams (Release 5).

Moscow International School of Translators/Interpreters; A.B. Borkovskii; "English-Russian Dictionary on programming and informatics"; p. 206; 1992; Moscow.

Standards Publishing; Russian Federal Standard 28806-90; "The quality of software, Terms and Definitions"; pp. 1-2; 1991.

Russian Patent Office; "Official Action"; pp. 1-3; Apr. 3, 2009. English translation included.

Russian Patent Office; B. P. Simonov; "Decision on Grant of a Patent for Invention"; whole document (English translation); Sep. 9, 2009.

3GPP TS25.435 V.5.5.0; 3rd Generation Partnership Project;Technical Specification Group Radio Access Network; "UTRAN Iur interface user plane protocols for Common Transport Channel data streams (Release 5)"; whole document; Jun. 2003.

\* cited by examiner

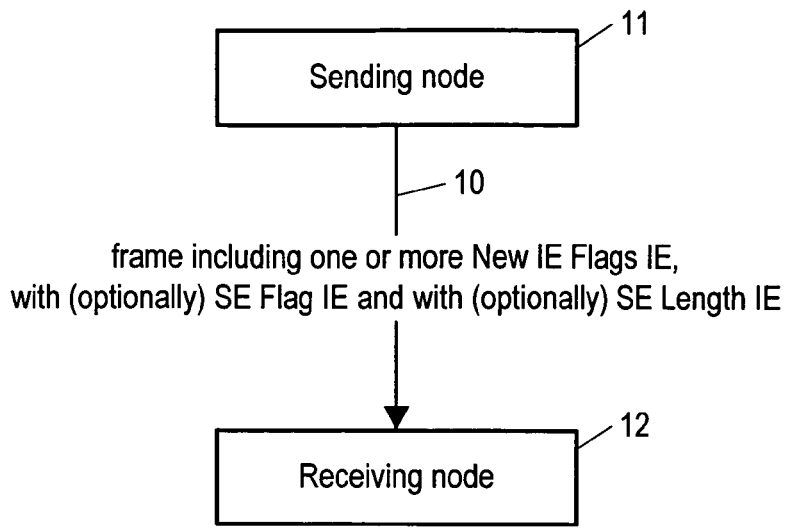
FIG. 1
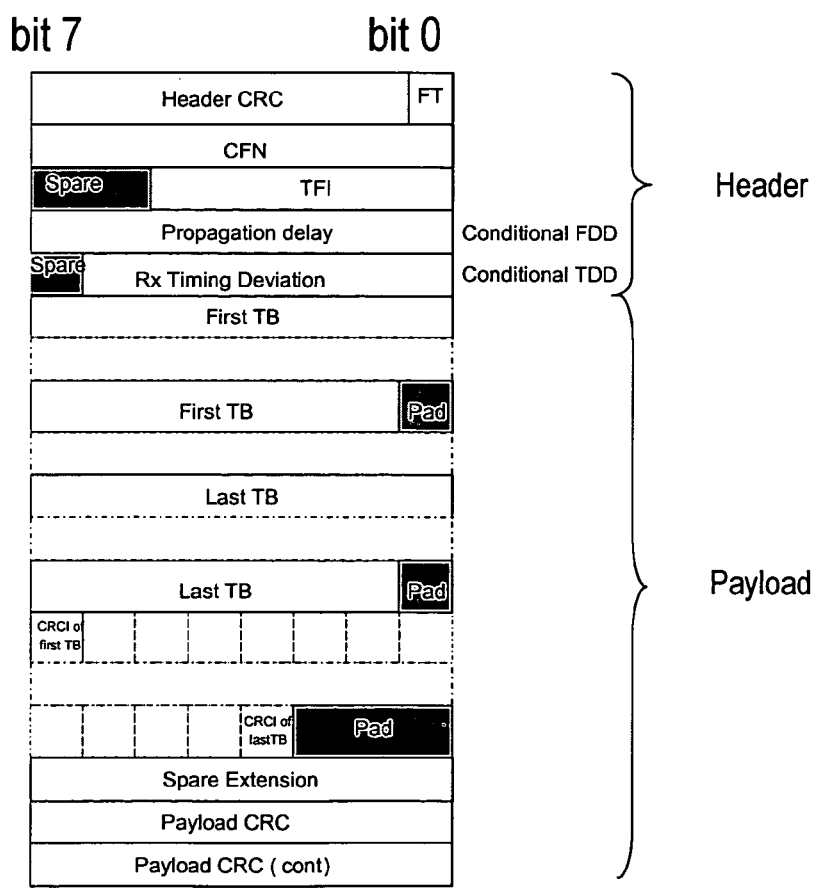
FIG. 5 (Current RACH Data Frame Structure in 25.435.) (Prior Art)

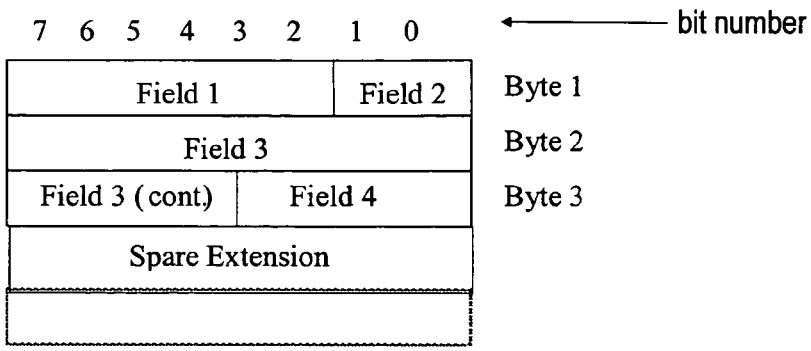
FIG. 2    (General Frame Structure.) (Prior Art)
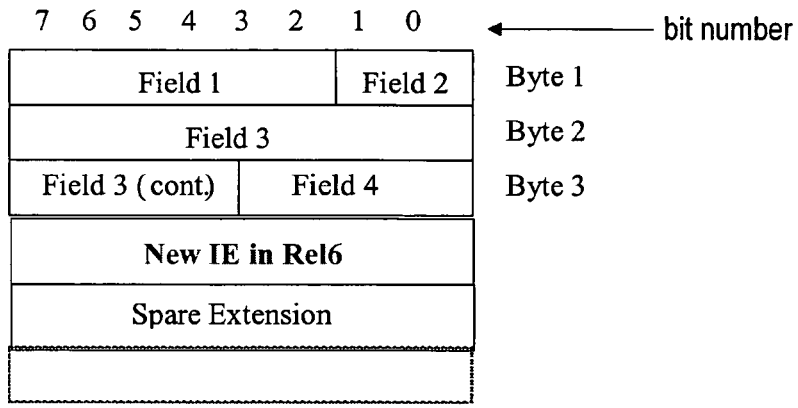
FIG. 3A    (After adding New Rel6 IE in the Spare Extension.) (Prior Art)
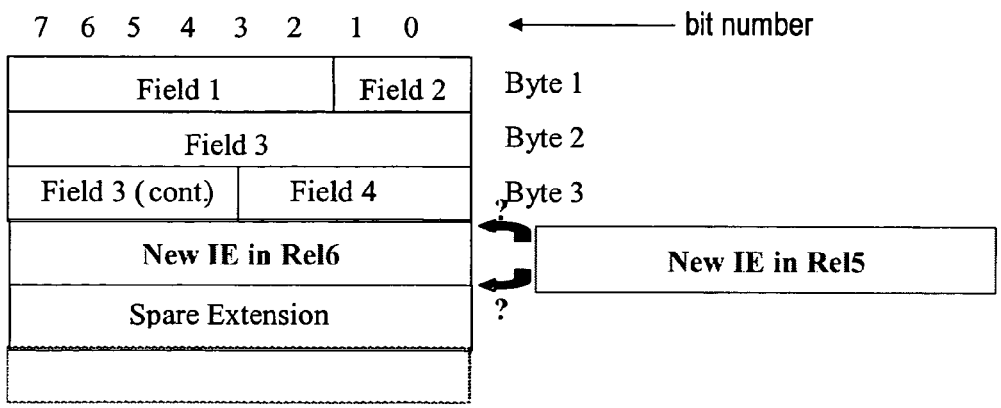
FIG. 3B    (Where to add Rel 5 IE?) (Prior Art)

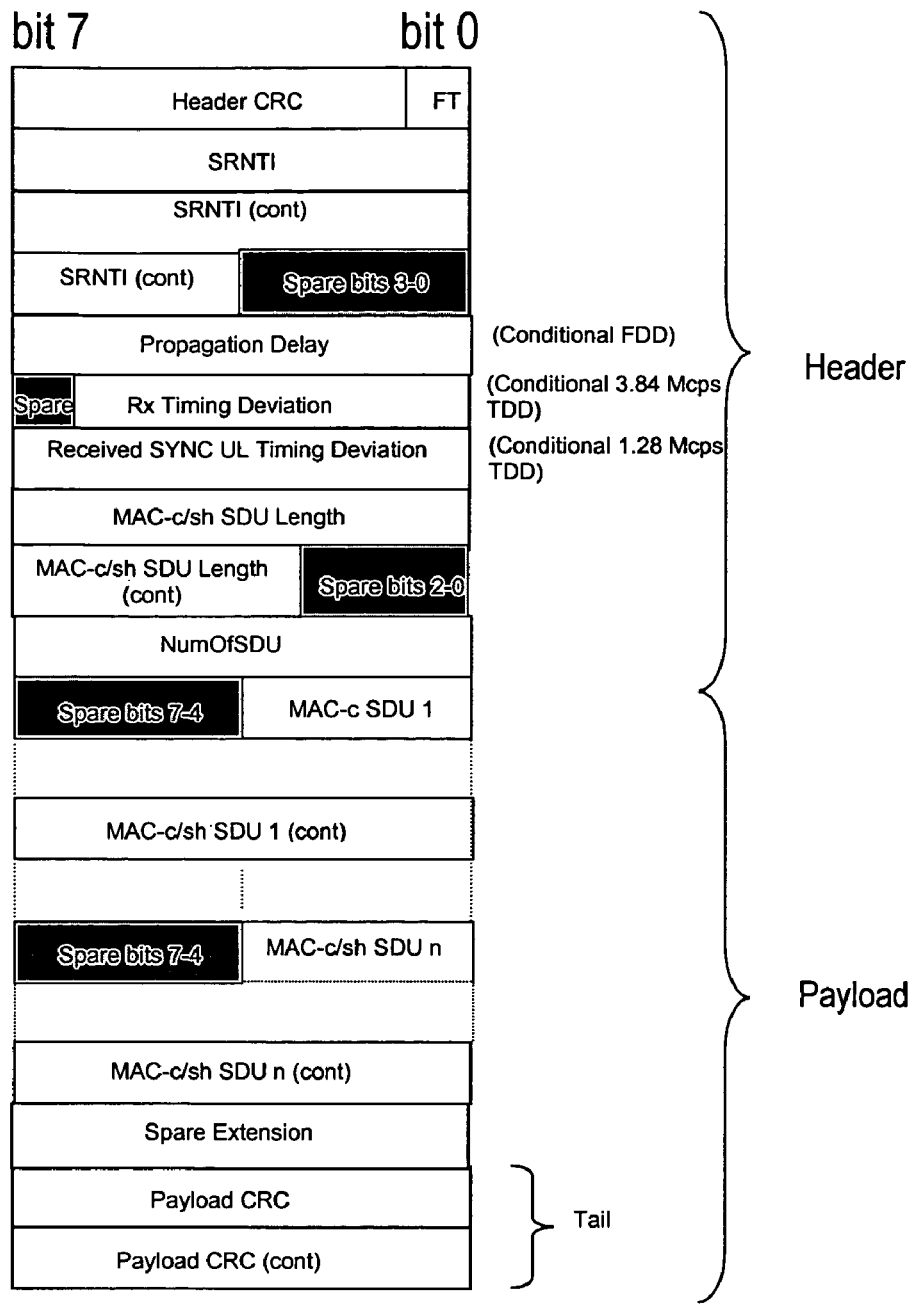
FIG. 4 (Current RACH Data Frame Structure in 25.425.) (Prior Art)

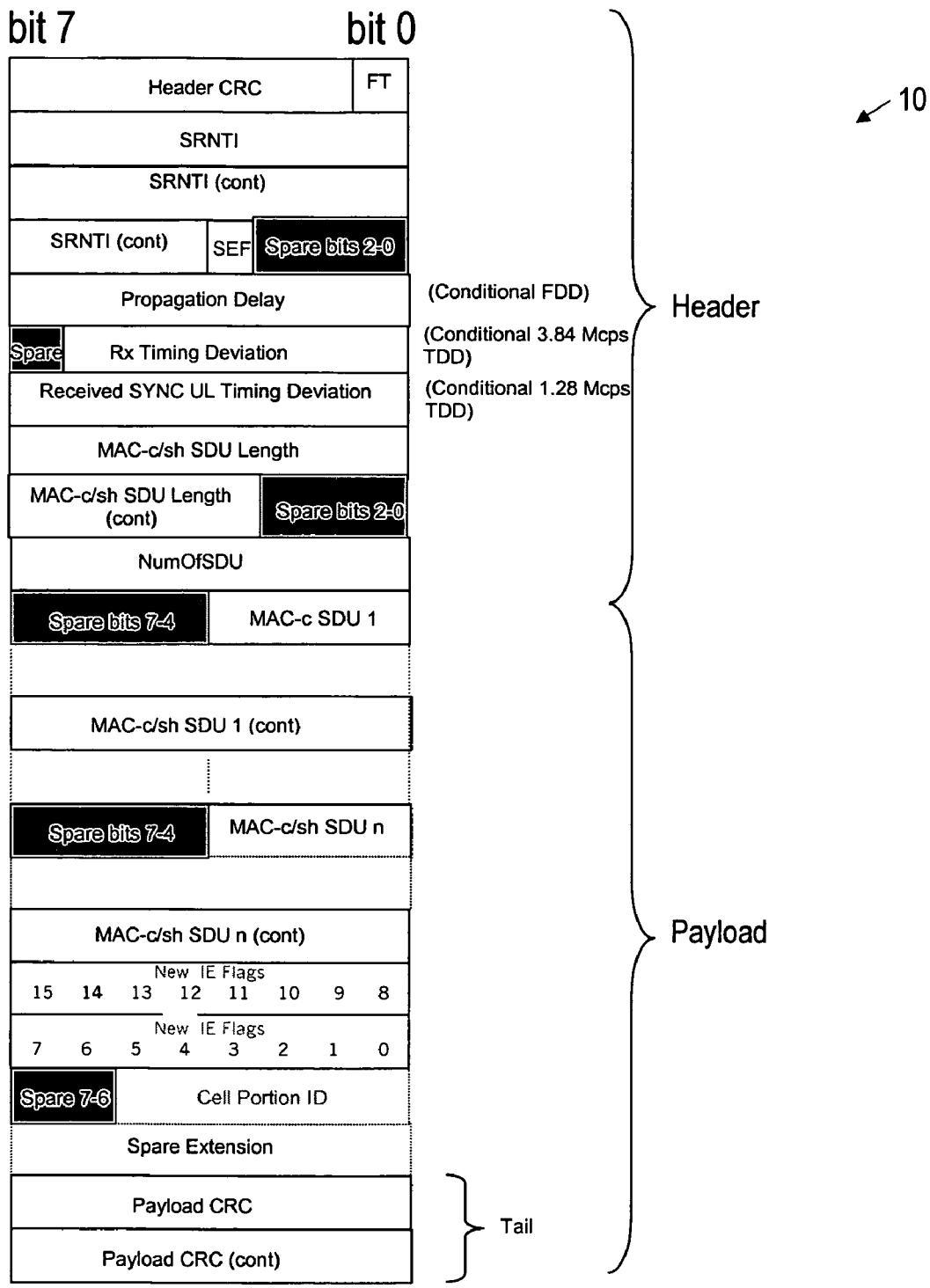
FIG. 6  (Proposed RACH Frame Structure in 25.425.)

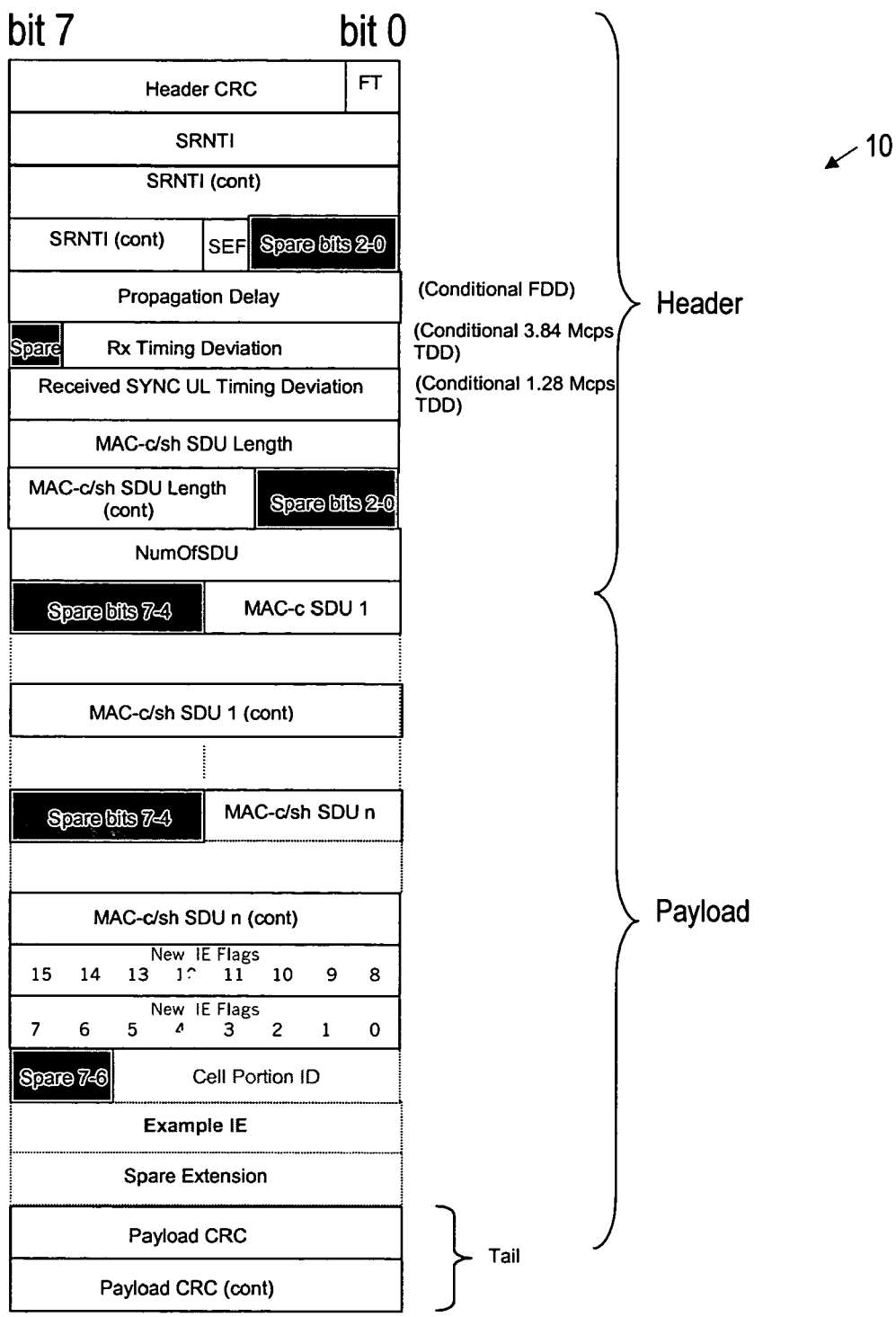
FIG. 7 (Example RACH Frame Structure in Rel6 25.425.)

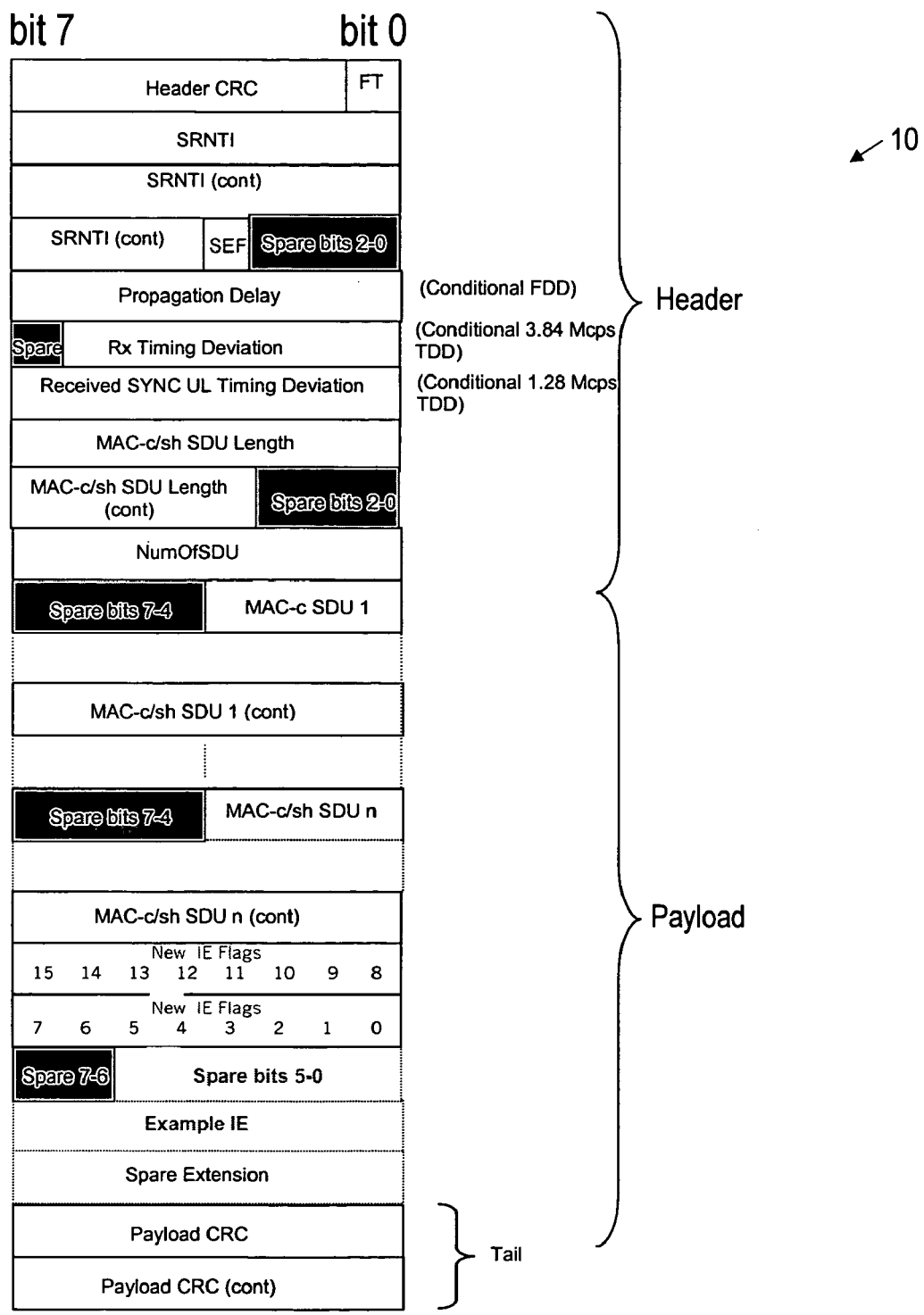
FIG. 8 (Example RACH Frame Structure in Rel99 25.425.)

(Example RACH Frame Structure with SE Length Field.)

(Example RACH Frame Structure with SE Length in the header.)

(Example RACH Frame Structure with SE Length in the Spare Bits of the header.)

GENERALIZED SPARE EXTENSION FIELD USAGE IN FRAME PROTOCOL DATA FRAME

CROSS REFERENCE TO RELATED APPLICATION

Reference is made to and priority claimed from U.S. provisional application Ser. No. 60/508,384, filed Oct. 3, 2003, entitled SPARE EXTENSION FIELD USAGE IN FRAME PROTOCOL DATA FRAME.

Reference is also made to and priority claimed from U.S. provisional application Ser. No. 60/519,537, filed Nov. 12, 2003, entitled GENERALIZED SPARE EXTENSION FIELD USAGE IN FRAME PROTOCOL DATA FRAME.

TECHNICAL FIELD

The present invention pertains to the field of wireless communication. More particularly, the present invention pertains to frame protocols used in wirelessly communicating over various different communication channels, especially such protocols according to 3GPP.

BACKGROUND ART

Data frames used in wirelessly communicating over various communication channels according to the third Generation Partnership Program (3GPP) (e.g. over the channels DCH, DSCH, HS-DSCH, RACH, FACH, and others) are prescribed by various 3GPP technical specifications for frame protocols—in particular, TS25.425, TS25.427 and TS25.435—each of which provides for a so-called Spare Extension (SE) IE (information element), i.e. each provides/specifies a location (a field) where an IE can be added to (specified for) a frame in later releases of the 3GPP technical specifications without making the frame incompatible with currently specified frames. For example, TS25.435 v5.5.0 specifies a location where 0-2 octets are reserved for future use (for one or more to-be-defined IEs). The SE section is provided for all releases from release '99 and later. Any fields added after so-called release '99 (to later versions of release '99 or to later releases) are added to the SE section.

Due to the lack of definition regarding the SE—i.e. due to lack of a specification as to how to use the SE in the 3GPP specifications for adding new IEs for a specification release (i.e. e.g. Rel-5 or Rel-6)—it is difficult to use the SE in practice. For one thing, it is hard to detect whether a SE is in use since to do so a receiving node must parse all the IEs in the payload part of a frame in order to find out if a SE is present, and even if the receiving node finds and extracts an SE part, it is hard for the receiving node to determine how the SE is used—i.e. it is hard to know, in case of more than one new IE being provided via the SE, in what order the IEs occur in the frame—since how to use it is not defined. For example, if an IE is added in Rel-6 and the Rel-6 specification is frozen, it is then hard to know how to add an IE to Rel-5 in case there is a critical error in the Rel-5 specification, necessitating a new IE. To understand this, refer to FIG. 2, which shows the Frame Structure, and then refer to FIGS. 3A and 3B, which illustrate that if we add an IE in the SE in Rel-6 and then freeze the specification, it is hard to know where to add a new IE in Rel-5 to correct a critical error.

One thing is for sure, though: where the new Rel-5 IE is added can have consequences. If we add the new Rel-5 IE in front of the Rel-6 IE for example, it will cause a change in the Rel-6 specification that is not backward compatible. If we add the new Rel-5 IE after the Rel-6 IE, then a Rel-5 implementation could also understand the Rel-6 IE.

Thus the invention addresses how to use the SE—i.e. how to add new IEs for a release and especially so as to accommodate earlier releases—and also addresses how to indicate whether the SE is in use.

Additionally, while the maximum size of the SEF in the control frames in the various above-mentioned frame protocols (i.e. those of TS25.425, TS25.427 and TS25.435) is 32 octets, the maximum size of the SEF in the protocols is only 2 octets, although there is perhaps no good reason for the difference in length. Such a small data frame spare extension can prove to be problematic because of overly restricting the SE. Thus the invention also addresses the length of the SE in data frames according to the above protocols.

DISCLOSURE OF THE INVENTION

In a first aspect of the invention, a frame protocol is provided for use in communicating between a sending node and a receiving node of a communication system information organized into a frame, the frame protocol comprising a step in which the sending node transmits the frame to the receiving node including in the frame a Spare Extension (SE) section conveying values for one or more information element (IE) fields, the frame protocol characterized in that the frame includes a New IE Flags IE for indicating to the receiving node via individual flags of the New IE Flags IE whether the SE section includes valid data for one or more respective IEs in the SE section.

In accord with the first aspect of the invention, the New IE Flags IE may indicate whether the SE section includes valid data for one or more respective IEs on the basis of a predetermined correspondence between positions of the bits of the New IE Flags IE and positions of respective sets of one or more bits occurring in the SE section.

Also in accord with the first aspect of the invention, the frame may include a SE Flag IE in a Spare Bits portion of the header of the frame, for indicating whether the SE section includes valid data for one or more IEs.

Also in accord with the first aspect of the invention, the frame may include at least a first SE Length IE and at least a first block including a first New IE Flags IE and a first SE subsection, with the first SE Length IE indicating the length of the first block.

Also in accord with the first aspect of the invention, the frame may include a plurality of blocks each in turn including a New IE Flags IE and a corresponding Spare Extension subsection, and a bit of each New IE Flags IE in each block may indicate whether a next pair is included in the frame as part of the block.

Also in accord with the first aspect of the invention, the frame may include a SE Length IE in the header of the frame for indicating whether the SE section includes valid data for one or more IEs, and if so, for indicating the length of the SE section.

Also in accord with the first aspect of the invention, the IEs in the SE section may be included in the order in which the IEs are introduced.

Also in accord with the first aspect of the invention, an IE occurring in the SE section and the corresponding bit in the New IE Flags IE may be treated by the receiving node as spare bits if the IE was introduced for a release of a specification frozen later in time than the release of the specification according to which the receiving node was implemented.

Also in accord with the first aspect of the invention, the frame may include in the SE only bits for IEs indicated by the New IE Flags IE as having valid data.

In a second aspect of the invention, an apparatus is provided, operative according to (i.e. able to operate or function according to) a frame protocol as in the first aspect of the invention, i.e. the apparatus is operative according to a frame protocol used in communicating between a sending node and a receiving node of a communication system information organized into a frame, the apparatus comprising means for transmitting the frame with the frame including a Spare Extension (SE) section conveying values for one or more information element (IE) fields, the apparatus characterized in that it provides as part of the frame a New IE Flags IE for indicating to the receiving node via individual flags of the New IE Flags IE whether the SE section includes valid data for one or more respective IEs in the SE section.

In a third aspect of the invention, a system is provided, comprising a sending node and a receiving node, with the sending node including an apparatus according to the second aspect of the invention.

In accord with the third aspect of the invention, the receiving node may be operative such that an IE occurring in the SE section of a received frame is treated as spare bits if the IE was introduced for a release of a specification frozen later in time than the release of the specification according to which the receiving node was implemented.

In a fourth aspect of the invention, a computer program product is provided, comprising: a computer readable storage structure embodying computer program code thereon for execution by a computer processor in e.g. a telecommunication terminal or node (or other device), with the computer program code such that it includes instructions for making the telecommunication terminal or node operative according to a frame protocol provided according to the first aspect of the invention.

In a fifth aspect of the invention, a frame protocol is provided, for use in communicating between a sending node and a receiving node of a communication system information organized into a frame, the frame protocol comprising a step in which the sending node transmits the frame to the receiving node including in the frame a Spare Extension (SE) section conveying values for one or more information element (IE) fields, the frame protocol such that the receiving node treats an IE field value occurring in the SE section as spare bits if the IE field was introduced for any version of a later release of a specification than the release of the specification according to which the receiving node was implemented.

In accord with the fifth aspect of the invention, each IE field in the SE section may have a predetermined fixed position in the SE section, regardless of whether the IE field includes valid data.

Also in accord with the fifth aspect of the invention, the IEs in the SE section may be included in the order in which the IEs are introduced.

Also in accord with the fifth aspect of the invention, an IE occurring in the SE section may have a reserved value for indicating when the value in the bit space is not valid.

In a sixth aspect of the invention, an apparatus is provided so as to be operative according to a frame protocol as in the fifth aspect of the invention.

In a seventh aspect of the invention, a system is provided, comprising a sending node and a receiving node, with the sending node including an apparatus as in the sixth aspect of the invention. Further, the receiving node may be operative such that an IE occurring in the SE section of a received frame is treated as spare bits if the IE was introduced for a release of a specification frozen later in time than the release of the specification according to which the receiving node was implemented.

In an eighth aspect of the invention, a computer program product is provided, comprising: a computer readable storage structure embodying computer program code thereon for execution by a computer processor in a telecommunication terminal or node, with the computer program code such in that it includes instructions for making the telecommunication terminal or node operative according to a protocol as in the fifth aspect of the invention.

BRIEF DESCRIPTION OF THE DRAWINGS

The above and other objects, features and advantages of the invention will become apparent from a consideration of the subsequent detailed description presented in connection with accompanying drawings, in which:

FIG. 1 is a block diagram/flow diagram showing a sending node of a wireless communication system transmitting a frame according to the invention to a receiving node.

FIG. 2 is a schematic representation of a General Frame Structure.

FIG. 3A is a schematic representation of a General Frame Structure After adding New Rel-6 IE in the Spare Extension.

FIG. 3B is a schematic representation of a General Frame Structure illustrating problem of "Where to add a Rel 5 IE?"

FIG. 4 is a schematic representation of a Current RACH Data Frame Structure in 25.425.

FIG. 5 is a schematic representation of a Current RACH Data Frame Structure in 25.435.

FIG. 6 is a schematic representation of a RACH Frame Structure in 25.425 according to the invention.

FIG. 7 is a schematic representation of an exemplary RACH Frame Structure in Rel-6 25.425.

FIG. 8 is a schematic representation of an exemplary RACH Frame Structure in Rel-99 25.425.

BEST MODE FOR CARRYING OUT THE INVENTION

Figure 9:
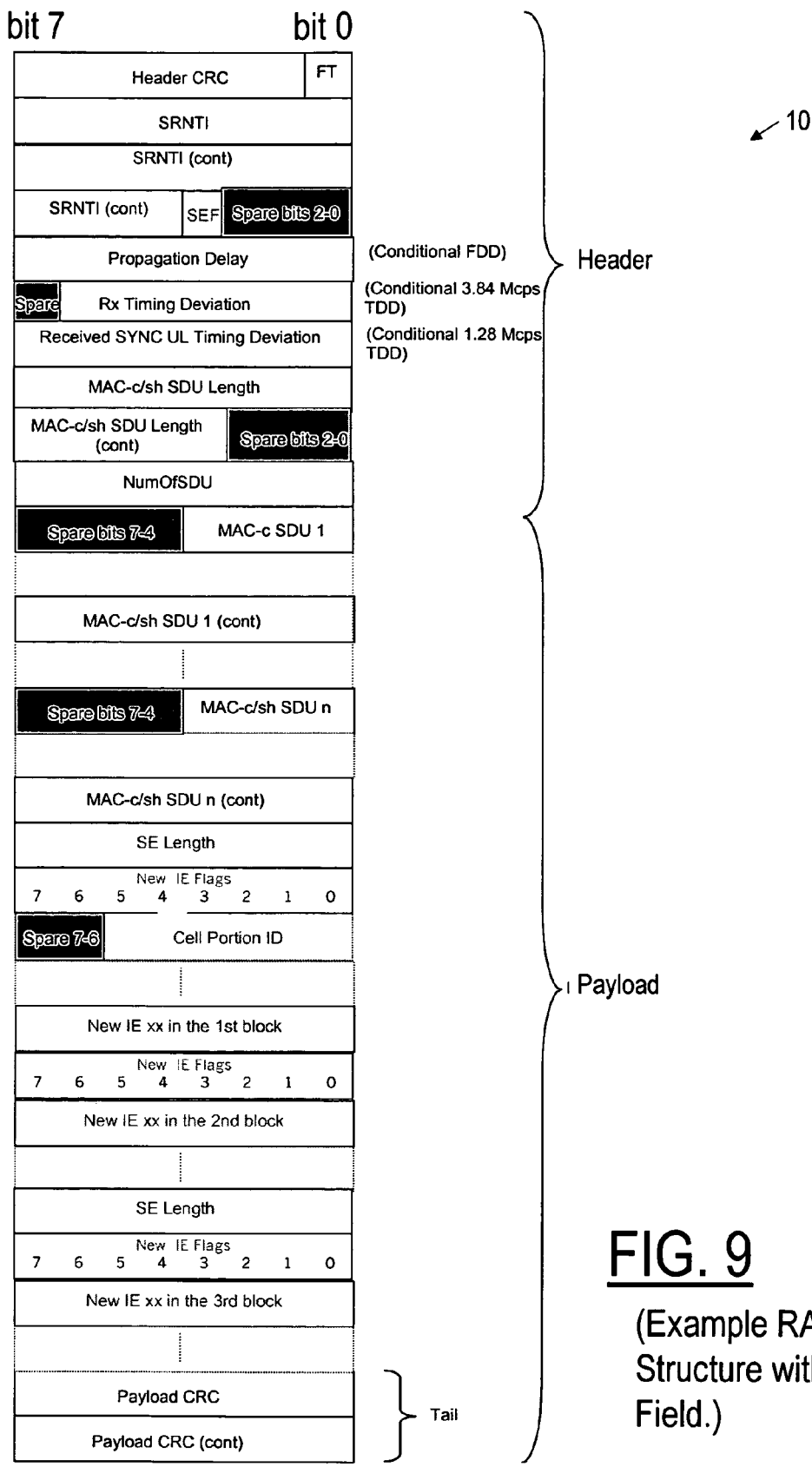
FIG. 9 is a schematic representation of an exemplary RACH Frame Structure with an SE Length Field in the SE.

Referring now to FIG. 1, the invention has to do with a sending node 11 of a wireless communication system transmitting to a receiving node 12 a frame 10 according to one or another 3GPP release of TS25.425, TS25.427 and TS25.435, as those technical specifications would be changed according to the invention. The invention is described below assuming that, as proposed by the invention and as described below, the length of the SE field in frames according to TS25.425, TS25.427 and TS25.435 is increased to 32 octets, so that the length of the SE field in the data frame is the same as in the control frame. However, it should be understood that the invention also applies in the case of SE fields of lengths other than 32 octets.

Also, to clarify, what is called the SE in TS25.425, TS25.427 and TS25.435 encompasses what in the description below is called the New IE Flags IE plus the SE.

As illustrated in FIG. 4 or FIG. 5, the extension mechanism for data frames (used for communication via the channels DCH, DSCH, HS-DSCH, RACH, FACH, and others) in the above-mentioned frame protocol specifications (TS25.425, TS25.427 and TS25.435) for (the most current/latest version of) Rel-5 is not very clear, nor are other releases. A SE field is defined but how to use it is not clearly specified. The definition of the SE field for the data frame provides only that it is a field of 0-2 octets indicating the location where new IEs can in the future be added in a backward compatible way. There is no specification as to how (where and in what order within the SE field) to add new IEs.

Thus the following problem can occur. If in Rel-5 a new IE is specified for a release (and version of the release), then after the frame protocol is frozen for the release (and version), there is no way to include some other IE in an earlier version in a backward compatible way. But this can happen at any time because if somebody finds an important error, it must be corrected (in the current version and all earlier versions). For this reason, in Application Protocols such as NBAP (Node B Application Part) and RNSAP (Radio Network Subsystem Application Part) a backward-compatible extension mechanism is well-defined, i.e. the respective specifications set out how to incorporate new IEs so that messages (in the application protocol, frames are called messages) can be properly interpreted by receiving nodes according to earlier specifications.

Thus in this invention, it is proposed to secure (i.e. more clearly define) the backward compatible extension mechanism in the frame protocols.

Preliminary to doing so, the maximum size of the SE field for the data frame is addressed. As specified, the maximum size of the SE field in the data frame is only 2 octets, while the maximum size of in the control frame is 32 octets. The invention proposes to extend the SE field of the data frame to more than 2 octets. In the description here 32 octets is assumed to be the length of the SE of the data frame, which is the same length as the SE field in the control frame, however other lengths are also encompassed by the invention.

Referring now to FIG. 6, the invention proposes to include a SEF (one-bit flag) in the Rel-99 data frame in the header part, using the so-called Spare Bits section of the header part, i.e. e.g. spare bit number 3. The definition of the SEF (one-bit flag) is preferably, according to the invention, as follows:

Spare Extension Flag (SEF)

Description: Contains flag indicating whether Spare Extension is in use or not.

Value Range:
0 Spare Extension is not in use.
1: Spare Extension.IE contains further IEs.

Field length: 1 bit.

With the SEF (one-bit flag) according to the invention, a receiving node can understand whether any (one or more) new IEs are defined in the Spare Extension field. If the SEF (one-bit flag) is "set" (i.e. to a value of "1" or some other predetermined value for indicating that the SE field contains further IEs) then a New IE Flags IE is set in the beginning part (or what is currently the beginning part) of the SE field so as to indicate which information is valid in bits of the SE field following the bits of the New IE Flags IE. The size of the New IE Flags IE could be for example one octet or two octets, depending on the 3GPP.

A proposed sample definition of New IE Flags IE applicable in case of a 5-bit IE indicated here as Cell Portion ID having been specified in a release after which the release was frozen, and also in case the Cell Portion ID is the first IE to have been introduced so that, according to the invention, it will (preferably) always appear first in the IEs occurring in the SE, no matter how many later IEs are added and irrespective of the releases for which the later-added IEs are first intended, is as follows:

New IE Flags IE

Description: contains flags indicating which information is valid in subsequent bits of the SE field.

Value Range:
Bit 0: Indicates if bits 0-5 of the $1^{st}$ byte of below field contains a valid Cell Portion ID (indicated by a value of 1) or not (indicated by a value of 0);
Bits 1-15: Set to 0: reserved for future use. Any indicated flags shall be ignored by a receiving node (implemented according to the release for which the Cell Portion ID IE was introduced).

Field length: 16 bits.

An illustrative definition of the Cell Portion ID IE is as follows:

Cell Portion ID [Frequency Division Duplex (FDD)]

Description: Cell Portion ID indicates the cell portion with highest SIR during RACH access. Cell Portion ID is configured by O&M (operations and maintenance).

Value range: {0-63}.

Field Length: 6 bits.

As mentioned, the Cell Portion ID IE shown in FIG. 6 is only an example of a new IE added via the SE field according to the invention (i.e. so as to have the New IE Flags IE indicate its occurrence in the SE, and—in some implementations—to be first indicated by an SEF as described above, the SEF indicating not specifically the Cell Portion ID IE, but rather that the SE contains at least one added IE). The example of how a sending node provides in the SE of a data frame (a value for) an IE added to the SE (by 3GPP). According to the invention, in case of 3GPP adding further IEs, such later-added IEs would preferably be added after the Cell Portion ID IE, and flags of the New IE Flags IE would correspond to the later-added IEs and such a flag would be set or not set, depending on whether a sending node in fact provides a value for the corresponding IE in the SE.

FIG. 6 shows one example of how to add one Rel-6 IE in the Spare Extension field. In this example, bit (number) 0 of the New IE Flags IE is used to indicate whether the $1^{st}$ IE after the New IE Flags IE has valid data or not. If another IE had been added after adding the Cell Portion ID IE (such as the Example IE shown in FIG. 7), then Bit (number) 1 in the New IE Flags IE would indicate whether the $2^{nd}$ IE (Example IE of FIG. 7 for example) is valid, i.e. whether the sending node provided actual data for the second added IE. Note that an IE referred to by a flag of the New IE Flags IE can be any length as long as it fits into the SE field, i.e. such an IE is not necessarily an octet; the flags of the New IE Flags IE need not correspond to octets, but can instead correspond to respective IEs, each of which can be as little as one bit or as long as several octets.

In the example of FIG. 6, the New IE Flags IE indicates the validity of IEs added via a fixed-size SE field. In such a scheme, if an IE is included, it can be always be placed in the same position in a data frame, regardless of what other IEs are present (since the New IE Flags IE can indicate what portions of the SE field are blank, i.e. do not convey an IE). Thus the protocol provided according to the above scheme provided by the invention is easy to implement. The drawback of the scheme is that since the New IE Flags IE only indicates the validity of a portion of the SE (i.e. the portion that conveys the respective IE), invalid IE bit spaces (i.e. bits not used by the sending node for conveying an added IE) are wasted. To overcome this drawback, the New IE Flags IE can be used to indicate whether actual data for an IE is included in the SE then providing in the SE only the IE having valid data, i.e. only the IEs for which flags of the New IE Flags IE are set. Thus, for example, if a sending node supports three functions corresponding to three one-byte-long IEs out of a possible five one-byte-long IEs that could occur in the SE (i.e. for which valid data could be provided by the SE), the respective flags of the New IE Flags IE would be set (as in the other scheme too), but instead of providing bit spaces for the IEs for which no valid data is sent, the sending node would provide an SE with only bits for the IEs indicated by the New IE Flags IE as having valid data, thus saving two bytes in the length of the SE and so in the length of the data frame.

FIG. 7 and FIG. 8 show how the protocol provided by the invention would work with different releases. What is illustrated there is that the IE called Cell Portion ID was added to the frame in Rel-6, which was then frozen. Then, to correct a problem with an earlier release, an IE called Example IE is added via the SE field. In such a scenario, any node implemented according to the earlier release will disregard the IE called Cell Portion ID and Bit 0 of the New IE Flags IE, i.e. such a node will treat the Cell Portion ID IE and Bit 0 of New IE Flags IE as spare bits. (If the receiving node does consider bit 0 of the New IE Flags IE as spare, it should know the flag of later release.) Thus, the invention, by use of the New IE Flags IE, allows for backward compatible additions of IEs to the frame.

FIG. 7 shows a RACH Data Frame in the Rel-6 specification according to the invention. In this case, bit 0 of the New IE Flags and bit 1 of the New IE Flags IE would be set (to 1) in order to show the existence of the Cell Portion ID IE and the Example IE, and would cause a Rel-6 receiving node to understand (read and interpret) the Cell Portion ID IE and the Example IE. In contrast, FIG. 8 shows the RACH Data Frame in the Rel-99 specification. In this case, bit 0 of the New IE Flags IE is, according to the invention (proposed to be) always 0 (i.e. proposed to be marked as a spare bit in a specification) and would be so-specified in the Frame Protocol specification (since the IE of the SE field corresponding to bit 0 of the New IE Flags IE is used only for a later release). Also, bit 1 of the New IE Flags IE is in Rel-99 (proposed to be) set (to 1) so as to indicate the validity of the Example IE. An exemplary definition of the New IE Flags IE in Rel-99 is as follows:

New IE Flags

Description: Contains flags indicating which information is valid in following bits.

Value Range:

Bit 0: Reserved. This bit shall be set to zero by the transmitter and shall be ignored by the receiver.

Bit 1: Indicates if the $2^{nd}$ byte of following the New IE Flags IE contains a valid Example IE, a value of 1 so indicating and a value of 0 indicating otherwise;

Bits 2-15: Set to 0. Reserved in this user plane revision. Any indicated flags shall be ignored by the receiver.

Field length: 16 bits.

In this example, if the receiving node is a Rel-6 node, it can understand both bit 0 of the New IE Flags IE as well as bit 1, and based on the values of bit 0 and bit 1, it can interpret Cell Portion ID IE and Example IE IE. If the receiving node is Rel-99, it will ignore bit 0 and the $1^{st}$ octet, and will use only bit 1 to determine whether Example IE IE is present in a data frame, and if so, the receiving node will attempt to read its value.

The sending node sets (or does not set) only the flags of the New IE Flags IE based on the specification according to which the sending node was implemented and based on what IEs the sending node is sending in a data frame. In the above example, a Rel-6 sending node will set (or not set) the values of bits 0 and 1 of the New IE Flags IE (depending on whether or not the transmitting node is including corresponding IEs in the data frame). On the other hand, a Rel-99 sending node will always put the value of bit 0 of the New IE Flags IE and $1^{st}$ byte of the SE field (or however many bits correspond to the 1st IE) to "0" and will set (or not set) only the value of bit 1 of the New IE Flags IE and also set as appropriate the values of the bits of the Example IE ($2^{nd}$ byte as shown) accordingly.

Another alternative for using the SE field is to have an SE Length IE in the first byte of the SE field as shown in FIG. 9. In such an alternative, the size of the SE field can be dynamic (i.e. size of the SE need not be predetermined). For such an alternative the New IE Flags IE and corresponding SE Length could be defined as follows:

New IE Flags

Description: Contains flags indicating which information is valid in later bits.

Value Range:

Bit 0: Indicates whether the $1^{st}$ next byte (bits 0-5) contains a valid Cell Portion ID, and if so is set to 1 and otherwise is set to 0;

Bits 1-6: Are set to 0: reserved in this user plane revision. Any indicated flags shall be ignored by the receiver.

Bit 7: Indicates whether another New IE Flags IE is defined after the IEs associated with the current New IE Flags IE. If the value is 1 then an additional New IE Flags IE is defined, and otherwise the current New IE Flags IE is the last New IE Flags IE in the data frame.

Field length: 8 bits.

SE Length

Description: Indicates the length of the extension in bytes that follows after this field, including the length of the New IE Flags IE. Since such an IE can indicate at most a value of 255, if the last New IE Flags IE within the indicated length indicates further New IE Flags IEs, there shall be a further SE Length IE before the next New IE Flags IE to indicate the next block of IEs.

Value range: 1-255

Field length: 8 bits.

As shown in FIG. 9, the SEF (one-bit flag) and the New IE Flags IE are still defined in the data frame but in this alternative the New IE Flags IE would have the extension mechanism (i.e. the last bit of each New IE Flags IE would indicate whether a next block of a New IE Flags IE and a corresponding SE subsection is present).

Figure 10:
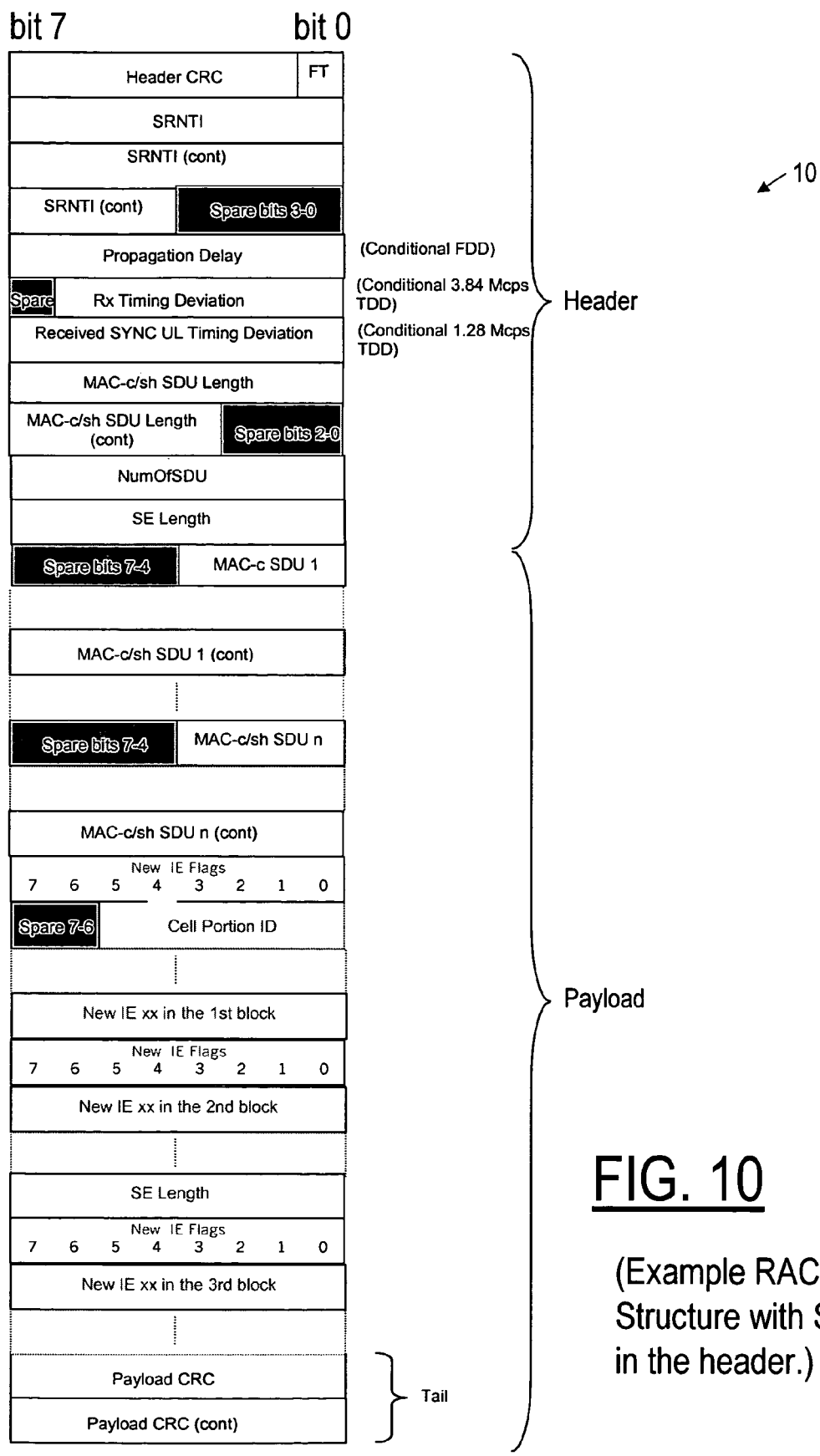
FIG. 10 is a schematic representation of an exemplary RACH Frame Structure with an 8-bit long SE Length Field in the header.
Figure 11:
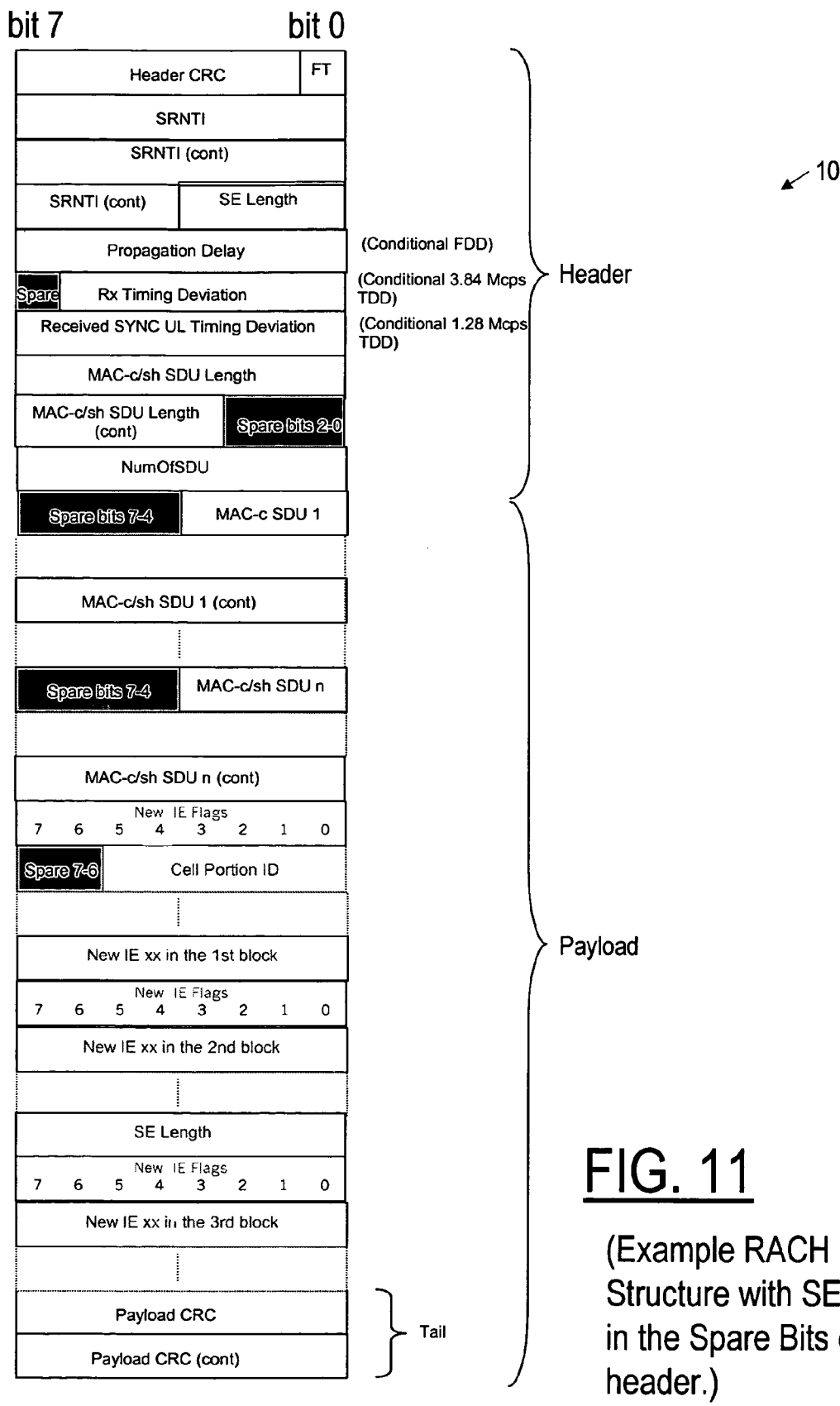
FIG. 11 is a schematic representation of an exemplary RACH Frame Structure with an SE Length Field of less than 8 bits and located in the Spare Bits section of the header.

There can be another scenario depending on where the 1st SE Length IE is defined. This SE Length can replace the SEF (one-bit flag) if it is defined in the header part. FIG. 10 shows this example. In this figure, the $1^{st}$ SE Length is defined in the header part. If it is "0" then the Spare Extension is of zero length. But as long as any new IE is included in the SE, then the SE Length according to the invention is proposed to indicate the length of the SE. The $1^{st}$ octet of the SE would then be the New IE Flags IE. The extension mechanism of SE length and New IE Flag is the same as above. In FIG. 10, a one-byte SE Length is proposed in the header, but the length could be shorter than 8 bits so that the $1^{st}$ SE Length can fit in the Spare Bits section in currently specified frames. FIG. 11 shows such an example. In such a case (SE length in Spare Bits section), the SE Length IE definition must be changed accordingly, i.e. both the length and the value range would be changed to correspond to the desired shorter length.

Adding a one-byte SE Length field in the header makes the definition of the SE Length IE easy. But adding an SE Length IE of one byte in the Rel-99 specification is not backward compatible, while adding a shorter $1^{st}$ SE Length IE in the header is backward compatible but makes defining the SE Length IE difficult.

It is important to understand that according to the invention and as described above, IEs are included in the SE preferably according to the order in which they are introduced, i.e. if 3GPP introduces a first new IE related to a frozen release, and then later introduces another IE related to a frozen release (any frozen release), then the first IE occurring in the SE is the first-introduced IE, and the second IE occurring in the SE is the second-introduced IE. Also, as mentioned, an IE in the SE is treated as spare bits by a receiving node implemented according to a release frozen earlier than the release for which the IE was introduced.

Although the invention has been described above so as to include the use of a New IE Flags IE, the invention also encompasses a frame protocol that does not rely on use of such an IE. Referring again to FIG. 1, the invention in general encompasses a frame protocol for use in communicating information between a sending node 11 and a receiving node 12 of a communication system (in which nodes 11 12 are implemented according to possibly different releases of a specification, the information being communicated organized into a frame 10, the frame protocol including a step in which the sending node 11 transmits the frame 10 to the receiving node 12 including in the frame 10 a SE section conveying values for one or more IE fields (introduced e.g. for use in any release from release '99 and later), the frame protocol such that the receiving node 12 treats an IE field value occurring in the SE section as spare bits if the IE field was introduced for a release frozen later in time than the release according to which the receiving node 12 was implemented, or in other words, the receiving node 12 treats an IE field value occurring in the SE section as spare bits if the IE field was introduced for any version of a later release of a specification than the release according to which the receiving node 12 was implemented.

In some embodiments, each IE field in the SE section has a predetermined fixed position in the SE section, regardless of whether the IE field includes valid data. Also in some embodiments, the IEs in the SE section are included in the order in which the IEs are introduced. Also in some embodiments, to make it possible for the receiving node to determine whether the bits for an IE in the SE section should be treated as spare bits, the invention provides—as an alternative to the use of the New IE Flags IE—that each IE occurring in the SE section has a reserved value for indicating when the value in the bit space is valid.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method, comprising:
   transmitting a frame containing information from a sending node to a receiving node of a communication system, and
   including in the frame a Spare Extension section conveying values for one or more information element fields,
   wherein the frame includes a New Information Element Flags Information Element for indicating via individual flags of the New Information Element Flags Information Element whether the Spare Extension section includes valid data for one or more respective information elements in the Spare Extension section on the basis of a predetermined correspondence between positions of the bits of the New Information Element Flags Information Element and positions of the one or more respective information elements occurring in the Spare Extension section, and
   wherein a bit of each New Information Element Flags Information Elements indicates whether a next pair of New Information Element Flags Information Element and one or more respective information elements is included in the frame.

2. The method as in claim 1, wherein the frame includes a Spare Extension Flag Information Element in a Spare Bits portion of the header of the frame, for indicating whether the Spare Extension section includes valid data for one or more information elements.

3. The method as in claim 1, wherein the frame includes at least a first Spare Extension Length Information Element and at least a first block including a first New Information Element Flags Information Element and a first Spare Extension subsection, wherein the first Spare Extension Length Information Element indicates the length of the first block.

4. The method as in claim 3, wherein the first block includes a plurality of successive pairs of New Information Element Flags Information Elements and corresponding Spare Extension subsections for providing added information elements, and wherein a bit of each New Information Element Flags Information Elements in the first block indicates whether a next pair is included in the frame as part of the first block.

5. The method as in claim 4, wherein the frame includes a plurality of blocks each in turn including a New Information Element Flags Information Element and a corresponding Spare Extension subsection, wherein a bit of each New Information Element Flags Information Element in each block indicates whether a next pair is included in the frame as part of the block.

6. The method as in claim 3, wherein the at least a first Spare Extension Length Information Element is included as one or more bits immediately preceding the first New Information Element Flags Information Element.

7. The method as in claim 3, wherein the frame includes a plurality of successive Spare Extension Length Information Elements and corresponding blocks of New Information Element Flags Information Elements and Spare Extension subsections.

8. The method as in claim 1, wherein the frame includes a Spare Extension Length Information Element in the header of the frame for indicating whether the Spare Extension section includes valid data for one or more information elements, and if so, for indicating the length of the Spare Extension section.

9. The method as in claim 8, wherein the length indicated by the Spare Extension Length Information Element is the length of the Spare Extension section plus the length of any associated New Information Element Flags Information Element.

10. The method as in claim 8, wherein the Spare Extension Length Information Element is included in a Spare Bits portion of the header of the frame.

11. The method as in claim 1, wherein the information elements in the Spare Extension section are included in the order in which the information elements are introduced for a release of a specification.

12. The method as in claim 1, wherein an information element occurring in the Spare Extension section and the corresponding bit in the New Information Element Flags Information Element are treated by the receiving node as spare bits if the information element was introduced for a release of a specification frozen later in time than the release of the specification according to which the receiving node was implemented.

13. A computer readable medium encoded with a computer program for execution by a computer processor in a telecommunication terminal or node, for performing the method of claim 1.

14. An apparatus, comprising:
   means for transmitting a frame including a Spare Extension section conveying values for one or more information element fields, and
   means for including as part of the frame a New Information Element Flags Information Element for indicating via individual flags of the New Information Element Flags Information Element whether the Spare Extension section includes valid data for one or more respective information elements in the Spare Extension section on the basis of a predetermined correspondence between positions of the bits of the New Information Element Flags Information Element and positions of the one or more respective information elements occurring the Spare Extension section,
   wherein a bit of each New Information Element Flags Information Elements indicates whether a next pair of New Information Element Flags Information Element and one or more respective information elements is included in the frame.

15. An apparatus as in claim 14, wherein the apparatus includes in the frame a Spare Extension Flag Information Element in a Spare Bits portion of the header of the frame and sets the Spare Extension Flag Information Element so as to indicate whether the Spare Extension section includes valid data for one or more information elements.

16. An apparatus as in claim 14, wherein the apparatus includes in the frame at least a first Spare Extension Length Information Element and at least a first block including a first New Information Element Flags Information Element and a first Spare Extension subsection, and further wherein the apparatus provides a value for the first Spare Extension Length Information Element so as to indicate the length of the first block.

17. An apparatus as in claim 16, wherein the apparatus is operative so that the first block includes a plurality of successive pairs of New Information Element Flags Information Elements and corresponding Spare Extension subsections for providing added information elements, and also so that a bit of each New Information Element Flags Information Elements in the first block indicates whether a next pair is included in the frame as part of the first block.

18. An apparatus as in claim 17, wherein the apparatus is operative so that the frame includes a plurality of blocks each in turn including a New Information Element Flags Information Element and a corresponding Spare Extension subsection, and also so that a bit of each New Information Element Flags Information Element in each block indicates whether a next pair is included in the frame as part of the block.

19. An apparatus as in claim 16, wherein the apparatus is operative so that at least a first Spare Extension Length Information Element is included as one or more bits immediately preceding the first New Information Element Flags Information Element.

20. An apparatus as in claim 16, wherein the apparatus is operative so that the frame includes a plurality of successive Spare Extension Length Information Elements and corresponding blocks of New Information Element Flags Information Elements and Spare Extension subsections.

21. An apparatus as in claim 14, wherein the apparatus is operative so that the frame includes a Spare Extension Length Information Element in the header of the frame for indicating whether the Spare Extension section includes valid data for one or more information elements, and if so, for indicating the length of the Spare Extension section.

22. An apparatus as in claim 21, wherein the apparatus is operative so that the length indicated by the Spare Extension Length Information Element is the length of the Spare Extension section plus the length of any associated New Information Element Flags Information Element.

23. An apparatus as in claim 21, wherein the apparatus is operative so that the Spare Extension Length Information Element is included in a Spare Bits portion of the header of the frame.

24. An apparatus as in claim 14, wherein the apparatus is operative so that the information elements in the Spare Extension section are included in the order in which the information elements are introduced for a release of a specification.

25. An apparatus as in claim 14, wherein the apparatus is operative so that an information element occurring in the Spare Extension section of a received frame and the corresponding bit in the New Information Element Flags Information Element are treated as spare bits if the information element was introduced for a release of a specification frozen later in time than the release of the specification according to which the receiving node was implemented.

26. A system, comprising a sending node and a receiving node, the sending node including an apparatus according to claim 16.

27. A system as in claim 26, wherein the receiving node is operative so that an information element occurring in the Spare Extension section of a received frame is treated as spare bits if the information element was introduced for a release of a specification frozen later in time than the release of the specification according to which the receiving node was implemented.

28. A method, comprising:
   receiving a frame containing information from a sending node of a communication system, and
   identifying in the frame a Spare Extension section conveying values for one or more information element fields,
   wherein a receiving node treats an information element field value occurring in the Spare Extension section as spare bits if the information element field was introduced for any version of a later release of a specification than the release of the specification according to which the receiving node was implemented, and
   wherein a bit of each New Information Element Flaas Information Elements indicates whether a next pair of New Information Element Flags Information Element and one or more respective information elements is included in the frame.

29. The method as in claim 28, wherein each information element field in the Spare Extension section has a predetermined fixed position in the Spare Extension section, regardless of whether the information element field includes valid data.

30. The method as in claim 28, wherein the information elements in the Spare Extension section are included in the order in which the information elements are introduced for a release of a specification.

31. The method as in claim 28, wherein an information element occurring in the Spare Extension section has a reserved value for indicating when the value in the bit space is not valid.

32. An apparatus, comprising:
   a receiver configured to receive a frame containing information from a sending node of a communication system, and
   a processor configured to identify in the frame a Spare Extension section conveying values for one or more information element fields,
wherein a receiving node treats an information element field value occurring in the Spare Extension section as spare bits if the information element field was introduced for any version of a later release of a specification than the release of the specification according to which the receiving node was implemented, and
wherein a bit of each New Information Element Flags Information Elements indicates whether a next pair of New Information Element Flags Information Element and one or more respective information elements is included in the frame.

33. A system, comprising a sending node and a receiving node, wherein the receiving node comprises a receiver configured to receive a frame containing information from a sending node of a communication system, and a processor configured to identify in the frame a Spare Extension section conveying values for one or more information element fields,
   wherein the receiving node treats an information element field value occurring in the Spare Extension section as spare bits if the information element field was introduced for any version of a later release of a specification than the release of the specification according to which the receiving node was implemented, and
   wherein a bit of each New Information Element Flags Information Elements indicates whether a next pair of New Information Element Flags Information Element and one or more respective information elements is included in the frame.

34. A system as in claim 33, wherein the receiving node is operative so that an information element occurring in the Spare Extension section of a received frame is treated as spare bits if the information element was introduced for a release of a specification frozen later in time than the release of the specification according to which the receiving node was implemented.

35. A computer readable medium encoded with a computer program for execution by a computer processor in a telecommunication terminal or node for performing a method comprising:
   receiving a frame containing information from a sending node of a communication system, and
   identifying in the frame a Spare Extension section conveying values for one or more information element fields,
wherein a receiving node treats an information element field value occurring in the Spare Extension section as spare bits if the information element field was introduced for any version of a later release of a specification than the release of the specification according to which the receiving node was implemented, and
wherein a bit of each New Information Element Flags Information Elements indicates whether a next pair of New Information Element Flags Information Element and one or more respective information elements is included in the frame.

36. An apparatus, comprising:
   a processor configured for transmitting a frame containing information to a receiving node, and
   wherein the processor is configured to include in the frame a Spare Extension section conveying values for one or more information element fields,
wherein the frame includes a New Information Element Flags Information Element for indicating to the receiving node via individual flags of the New Information Element Flags Information Element whether the Spare Extension section includes valid data for one or more respective information elements in the Spare Extension section on the basis of a predetermined correspondence between positions of the bits of the New Information Element Flags Information Element and positions of the one or more respective information elements occurring in the Spare Extension section, and
wherein a bit of each New Information Element Flags Information Elements indicates whether a next pair of New Information Element Flags Information Element and one or more respective information elements is included in the frame.

37. The apparatus as in claim 36, wherein the frame includes a Spare Extension Flag Information Element in a Spare Bits portion of the header of the frame, for indicating whether the Spare Extension section includes valid data for one or more information elements.

38. The apparatus as in claim 36, wherein the frame includes at least a first Spare Extension Length Information Element and at least a first block including a first New Information Element Flags Information Element and a first Spare Extension subsection, wherein the first Spare Extension Length Information Element indicates the length of the first block.

39. The apparatus as in claim 36, wherein the frame includes a Spare Extension Length Information Element in the header of the frame for indicating whether the Spare Extension section includes valid data for one or more information elements, and if so, for indicating the length of the Spare Extension section.

40. The apparatus as in claim 36, wherein the information elements in the Spare Extension section are included in the order in which the information elements are introduced for a release of a specification.

41. The apparatus as in claim 36, wherein an information element occurring in the Spare Extension section and the corresponding bit in the New Information Element Flags Information Element are treated by the receiving node as spare bits if the information element was introduced for a release of a specification frozen later in time than the release of the specification according to which the receiving node was implemented.

* * * * *

UNITED STATES PATENT AND TRADEMARK OFFICE
CERTIFICATE OF CORRECTION

PATENT NO. : 7,688,854 B2  Page 1 of 1
APPLICATION NO. : 10/932546
DATED : March 30, 2010
INVENTOR(S) : Woonhee Hwang It is certified that error appears in the above-identified patent and that said Letters Patent is hereby corrected as shown below:

In column 12, line 44, which is claim 26, line 3, "claim 16" should be --claim 14--.

In column 12, line 64, which is claim 28, line 12, "Flaas" should be --Flags--.

Signed and Sealed this

Twenty-second Day of June, 2010

David J. Kappos
*Director of the United States Patent and Trademark Office*